(12) United States Patent
Hayashida

(10) Patent No.: US 7,509,664 B2
(45) Date of Patent: Mar. 24, 2009

(54) DIGITAL BROADCAST RECEIVING APPARATUS

(75) Inventor: Toshitaka Hayashida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 874 days.

(21) Appl. No.: 10/409,897

(22) Filed: Apr. 9, 2003

(65) Prior Publication Data

US 2004/0055009 A1 Mar. 18, 2004

(30) Foreign Application Priority Data

Apr. 9, 2002 (JP) ............................ P2002-105948

(51) Int. Cl.
*G06F 3/00* (2006.01)
*G06F 13/00* (2006.01)
*H04N 5/445* (2006.01)

(52) U.S. Cl. ............................. 725/52; 725/37; 725/44

(58) Field of Classification Search .................. 725/58, 725/37, 39, 44, 52
See application file for complete search history.

(56) References Cited

U.S. PATENT DOCUMENTS

| 5,682,206 | A | * | 10/1997 | Wehmeyer et al. | ............. 725/58 |
| 5,699,107 | A | * | 12/1997 | Lawler et al. | .................. 725/58 |
| 5,844,620 | A | * | 12/1998 | Coleman et al. | .............. 725/54 |
| 5,990,927 | A | * | 11/1999 | Hendricks et al. | ............ 725/132 |
| 6,018,372 | A | * | 1/2000 | Etheredge | .................... 725/44 |
| 6,034,677 | A | * | 3/2000 | Noguchi et al. | ............. 715/719 |
| 7,111,320 | B1 | * | 9/2006 | Novak | ......................... 725/139 |
| 2002/0047894 | A1 | * | 4/2002 | Steading et al. | ................ 348/44 |
| 2003/0154478 | A1 | * | 8/2003 | Hassell et al. | ................. 725/39 |

FOREIGN PATENT DOCUMENTS

| JP | 8-251496 | 9/1996 |
| JP | 10-262192 | 9/1998 |
| JP | 2000-115658 | 4/2000 |
| JP | 2001-203960 | 7/2001 |

OTHER PUBLICATIONS

Japanese Office Action for Japanese patent application No. 2002-105948, mailed Jan. 24, 2007, and English translation thereof, 3 pages.
Patent Abstracts of Japan, Publication No. 201-203960, Publication Date Jul. 27, 2001, 2 pages.
Japanese Office Action for Japanese Patent Application 2002-105948, mailed Apr. 20, 2007, and English translation thereof, 5 pages.

* cited by examiner

*Primary Examiner*—John W. Miller
*Assistant Examiner*—John R. Schnurr
(74) *Attorney, Agent, or Firm*—Osha • Liang LLP

(57) ABSTRACT

There are provided display controller 15 for displaying a partition line S in each program unit constructed with respect to a program displayed by one program frame as one program even though being constructed of plural programs and postponing or advancing and displaying a cursor positioned in all of the program frame in a unit of the partition line S, and recording controller 19 for making a recording reservation in a time zone of a cursor portion displayed by this display controller 15.

3 Claims, 4 Drawing Sheets

| | 12:00 | 1:00 | 2:00 | 3:00 |
|---|---|---|---|---|
| NHK 1 | | NEWS | SPORT | |
| NHK 2 | | | | VARIETY |
| NHK hv | | SPORT | | |
| BS ASAHI 1 | | NOSTALGIC MOVIE | | |
| BS ASAHI 2 | | (1) | (2) | (3) |
| BS NIPPON TELEVISION | | MUSIC | | |

S      S

| | 12:00 | 1:00 | 2:00 | 3:00 |
|---|---|---|---|---|
| NHK 1 | NEWS | | SPORT | |
| NHK 2 | | | | VARIETY |
| NHK hv | | SPORT | | |
| BS ASAHI 1 | | NOSTALGIC MOVIE | | |
| BS ASAHI 2 | (1) | | (2) | (3) |
| BS NIPPON TELEVISION | | MUSIC | | |

DIGITAL BROADCAST RECEIVING APPARATUS

BACKGROUND OF THE INVENTION

The present invention relates to a digital broadcast receiving apparatus for displaying an electronic program guide on a monitor, and particularly to a digital broadcast receiving apparatus for making a recording reservation for a program using the electronic program guide.

In recent years, in digital satellite broadcasting using a broadcasting satellite or a communication satellite, broadcast on multiple channels is implemented by performing encoding through a compression method such as MPEG2 (Moving Picture Experts Group 2) which is international standards and sending. Because of this, for example, the number of channels becomes as large as 200 to 300 and an operation for selecting a desired program from among these also becomes complicated.

Thus, electronic program guide (EPG) data for providing notification of a schedule of a broadcast program or the contents of a program is transmitted together with a television broadcast signal. An electronic program guide is displayed on a monitor based on this electronic program guide data and using the displayed electronic program guide, a user makes a selection of a desired program or a recording reservation.

Such an electronic program guide is constructed in a matrix manner, for example, in which the axis of ordinate is a channel axis and the axis of abscissa is a time axis, and a program frame corresponding to broadcast time of each program is displayed, and a program name is displayed within each the program frame. For example, in the case of making a recording reservation, when a cursor positioned in a program unit on the electronic program guide displayed on the monitor is moved and the cursor is positioned in a desired program and, for example, a decision key is pushed down, it is constructed so as to complete a recording reservation for this program.

However, in the conventional electronic program guide described above, in the case of making a recording reservation, it is constructed so as to position a cursor in a desired program and make a recording reservation for this program, so that the recording reservation could be made in a program unit, but a recording reservation by making time setting freely could not be made, for example, a recording reservation in which the last five minutes of a program is advanced could not be made.

By the way, in the conventional electronic program guide, a program displayed by one program frame as one program even though being constructed of plural programs is present. That is, for example, as shown in FIG. 6, there is a case that a program displayed by one program frame of "nostalgic movies" is constructed of three movies such as "Godzilla", "Star Wars" and "Matrix". In such a case, a cursor is positioned in the program frame of "nostalgic movies" and in the case of making a recording reservation, a recording reservation for the entire program of "nostalgic movies" could be made, but a recording reservation could not be made in an individual movie unit. This causes the following disadvantages. In other words, even when a movie which wants to be recorded among the three movies is one, there is a disadvantage that the other two movies must be recorded together, and further there is the following disadvantage on making recording of three movies (or the number of movies of three or more movies). As recording equipment, it is considered that a hard disk recorder capable of long-time recording of about ten hours becomes widespread in the future, but under present circumstances, a VCR of a VHS type is general, so that when three movies are recorded, there is a disadvantage that triple recording by a 120-minute tape must necessarily be selected and image quality becomes worse. In case that one movie can be extracted to make recording, high-quality recording can be made even for a general VCR.

Further, a program guide display apparatus in which in the case that there are plural short-time programs with short broadcast time, when a cursor shows a marker, only a part of short-time program guides is displayed and display of the short-time program guides is switched according to an operation of a display switching key and plural short-time program guides are displayed using small space is disclosed in, for example, the Unexamined Japanese Patent Application No. Hei10-262192.

However, in this case, it is a method for displaying the plural short-time program guides difficult to display in limited space, and the plural short-time program guides are respectively constructed as one program, so that the above-described object in a program displayed by one program frame as one program even though being constructed of the plural programs as described above cannot be solved.

SUMMARY OF THE INVENTION

Therefore, the invention is implemented in view of the problems, and an object of the invention is to provide a digital broadcast receiving apparatus capable of increasing flexibility to make a recording reservation without being obsessed with a program unit in the case of making a recording reservation using an electronic program guide.

In order to achieve the object, according to a first aspect, in a digital broadcast receiving apparatus for having a movable cursor in a program unit on an electronic program guide displayed on a monitor and making a recording reservation for a program in which the cursor is positioned in the program unit, the digital broadcast receiving apparatus according to the invention comprises display controller for displaying a partition line in each the program unit constructed with respect to a program displayed by one program frame as one program even though being constructed of plural programs and also changing and displaying a cursor positioned in all of the program frame in a unit of the partition line, and recording controller for making a recording reservation for the constructed program in which the cursor changed and displayed in the unit of the partition line is positioned.

Further, according to a second aspect, in a digital broadcast receiving apparatus for having a movable cursor in a program unit on an electronic program guide displayed on a monitor and making a recording reservation for a program in which the cursor is positioned in the program unit, the digital broadcast receiving apparatus comprises display controller for changing and displaying a cursor positioned in the program unit every predetermined time unit from program start time and program end time, and recording controller for making a recording reservation from start time to end time at which the cursor changed and displayed in the predetermined time unit is positioned.

Further, according to a third aspect, there is provided a digital broadcast receiving apparatus according to the first aspect, wherein a remote control light receiving part is connected to the display controller, and a control signal from another remote controller is inputted to the display controller through the remote control light receiving part to change and display the cursor in a unit of the partition line.

Further, according to a forth aspect, there is provided a digital broadcast receiving apparatus according to the second aspect, wherein a remote control light receiving part is connected to the display controller, and a control signal from another remote controller is inputted to the display controller through the remote control light receiving part to change and display the cursor every predetermined time unit.

Further, according to a fifth aspect, there is provided a digital broadcast receiving apparatus according to the third aspect, wherein a decision key, a right arrow key and a left arrow key are mounted on the remote controller, if the right arrow key is pushed down within a predetermined time after an action of making a normal recording reservation, a control signal by the action is input to the display controller, the cursor is changed and displayed in a unit of the partition line to perform stage postponement of recording start time by the number of pushing down, and if the left arrow key is pushed down within a predetermined time after an action of making a normal recording reservation, a control signal by the action is input to the display controller, the cursor is changed and displayed in a unit of the partition line to perform stage advancement of recording end time by the number of pushing down.

Further, according to a sixth aspect, there is provided a digital broadcast receiving apparatus according to the forth aspect, wherein a decision key, a right arrow key and a left arrow key are mounted on the remote controller, if the right arrow key is pushed down within a predetermined time after an action of making a normal recording reservation, a control signal by the action is input to the display controller, the cursor is changed and displayed in a unit of the predetermined time to perform stage postponement of recording start time by the number of pushing down, and if the left arrow key is pushed down within a predetermined time after an action of making a normal recording reservation, a control signal by the action is input to the display controller, the cursor is changed and displayed in a unit of the predetermined time to perform stage advancement of recording end time by the number of pushing down.

Further, according to a seventh aspect, there is provided a digital broadcast receiving apparatus according to the second aspect, wherein the predetermined time of a unit is set to be an arbitrary time by an operator at initialization.

Further, according to an eighth aspect, there is provided a digital broadcast receiving apparatus according to the forth aspect, wherein the predetermined time of a unit is set to be an arbitrary time by an operator at initialization.

Further, according to a ninth aspect, there is provided a digital broadcast receiving apparatus according to the sixth aspect, wherein the predetermined time of a unit is set to be an arbitrary time by an operator at initialization.

DETAILED DESCRIPTION OF THE PREFERRED EMBODIMENTS

Figure 1:
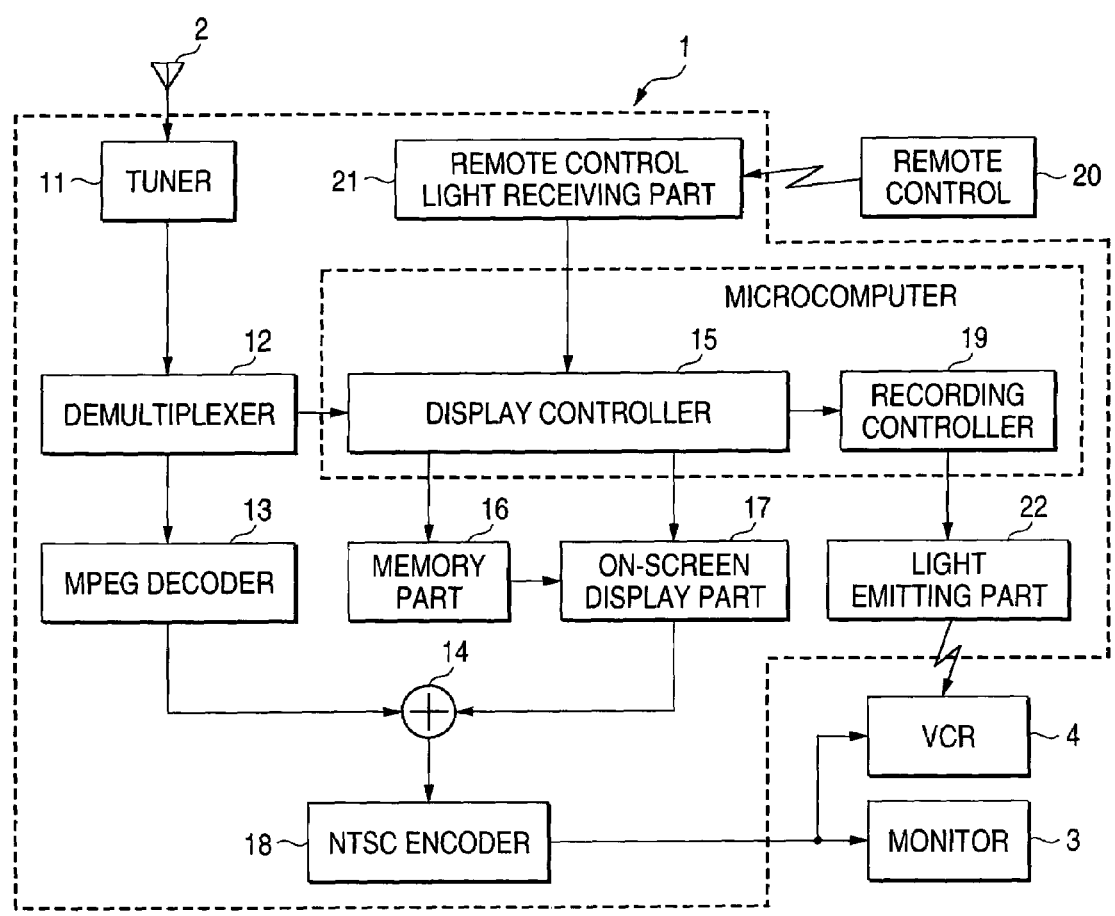
FIG. 1 is a block diagram showing a schematic configuration of a digital broadcast receiving apparatus of the invention.

An embodiment of the invention will be described below with reference to the drawings. FIG. 1 is a block diagram showing a schematic configuration of a digital broadcast receiving apparatus of the invention.

In the present embodiment, as shown in FIG. 1, a digital broadcast receiving apparatus 1 is connected to an antenna 2 for receiving a digital broadcast signal relayed by a satellite (a broadcasting satellite or a communication satellite), a monitor 3 for performing video display, and a VCR (video cassette recorder) 4 for making video recording.

A tuner 11 of the digital broadcast receiving apparatus 1 makes a channel selection of the digital broadcast signal received by the antenna 2 and demodulates the signal and sends the signal to a demultiplexer 12. The demultiplexer 12 separates a packet outputted from the tuner 11 into MPEG data compressively encoded by an MPEG method and additional information such as electronic program guide data. The MPEG data separated by the demultiplexer 12 is sent to an MPEG decoder 13. The MPEG decoder 13 performs decoding processing of the MPEG data sent from the demultiplexer 12 and sends a video signal in which the decoding processing is performed to a multiplexer 14.

Incidentally, the electronic program guide data transmitted together with the digital broadcast signal is data for providing notification of a schedule of a broadcast program or the contents of a program, and includes information (for example, broadcasting station names, channels, broadcast time (broadcast start time and broadcast end time), program titles, program contents) about each the program from the present time to the subsequent several tens of hours.

On the other hand, the additional information separated by the demultiplexer 12 is sent to display controller 15 implemented by a microcomputer. This display controller 15 stores the additional information sent from the demultiplexer 12 in a memory part 16. Further, the display controller 15 sends an on-screen control signal for on-screen displaying various operation screens such as an electronic program guide on the monitor 3 to an on-screen display part 17. The on-screen display part 17 takes predetermined information out of the memory part 16 based on the on-screen control signal and generates display data of an electronic program guide screen, a menu screen, etc. and sends the data to the multiplexer 14 as an on-screen signal.

The multiplexer 14 combines and processes the video signal outputted from the MPEG decoder 13 and the on-screen signal outputted from the on-screen display part 17 and sends the signal to an NTSC encoder 18. The NTSC encoder 18 converts the inputted video signal into a video signal of an NTSC type and outputs the video signal to the monitor 3 and the VCR 4.

Figures 2, 3:
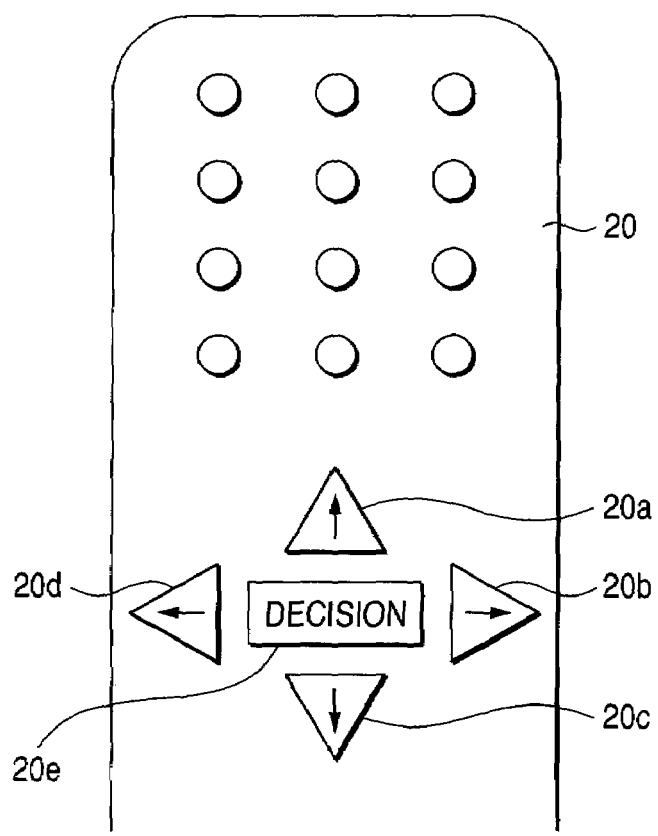
FIG. 2 is a view showing a configuration example of button switches of a remote control.
FIG. 3 is a diagram showing a display example of an electronic program guide.

A remote control 20 comprises button switches such as directional keys 20a to 20d for operating in four directions of vertical and horizontal directions, a decision key 20e for operating at the time of deciding an operation, numeric keys in which numeric characters of 0 to 9 are indicated as shown in FIG. 2. A remote control signal from the remote control 20 is inputted to the display controller 15 through a remote control light receiving part 21.

In an electronic program guide displayed by the display controller 15, each broadcasting station name is displayed using the axis of ordinate as a channel axis and broadcast time is displayed using the axis of abscissa as a time axis as shown in FIG. 3. A program frame corresponding to the broadcast time of each program is displayed in a matrix manner in a predetermined position defined by the axis of ordinate and the axis of abscissa, and a program name is displayed within each the program frame. In the embodiment, program names of three hours from the present time of six channels are displayed every channel.

Further, the display controller 15 displays a movable cursor positioned in each program frame unit on the electronic program guide. The cursor is constructed so as to display the positioned program frame by different color or luminance (brightness). When the directional keys of the remote control 20 are operated, the cursor respectively moves in an up direction, a down direction, a right direction or a left direction according to a direction operation of an up arrow key 20a, a down arrow key 20c, a right arrow key 20b or a left arrow key 20d of the directional keys.

The display controller 15 displays partition lines S displayed inconspicuously by a dotted line or a light color in program units constructed respectively in a program (hereinafter called "a large frame constructed program") displayed by one program frame as one program even though being constructed of plural programs. That is, for example, as shown in FIG. 3, in the case that a program displayed by one program frame of "nostalgic movies" is constructed of three movies such as "Godzilla" (1), "Star Wars" (2) and "Matrix" (3), the partition lines S are displayed between "Godzilla" and "Star Wars" and between "Star Wars" and "Matrix" based on electronic program guide data.

Next, an action of the case of making a recording reservation for a desired program will be described.

When the decision key 20e of the remote control 20 is pushed down in a state of positioning a cursor in a program frame (normal program) in which the partition line S is not displayed, recording controller 19 makes a recording reservation for a program of the program frame in which the cursor is positioned. That is, a channel of this program and broadcast start time are set as recording start time, and the channel and broadcast end time are set as recording end time.

Then, in the case of becoming broadcast start time of this program, the recording controller 19 outputs a recording signal from a light emitting part 22 provided in a predetermined position near to the remote control light receiving part of the VCR 4. By this recording signal, the VCR 4 makes recording of a video signal outputted from the NTSC encoder 18. Next, in the case of becoming broadcast end time of this program, the recording controller 19 outputs a recording stop signal from the light emitting part 22. By this recording stop signal, the VCR 4 stops the recording of the video signal outputted from the NTSC encoder 18.

Figure 4:
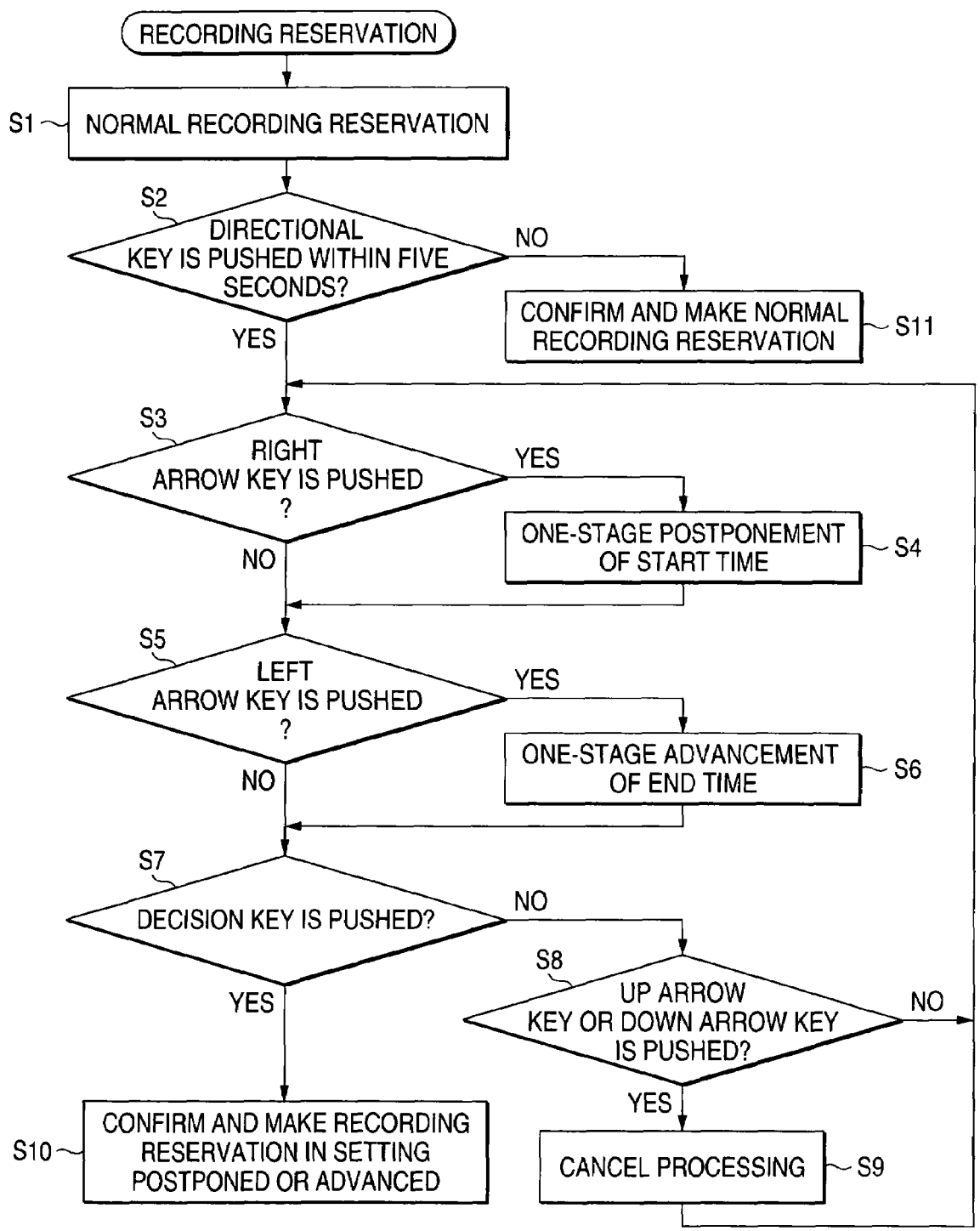
FIG. 4 is a flow diagram showing an action of the case of making a recording reservation for a program.
Figure 5A:
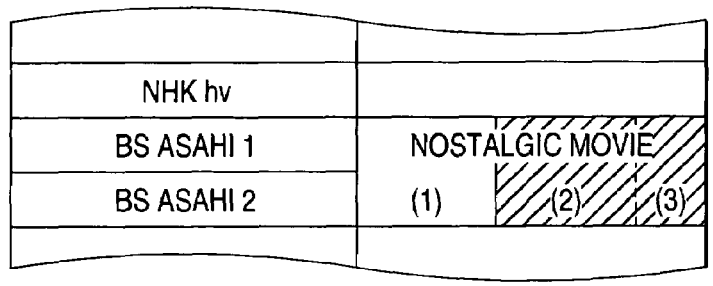
FIGS. 5A and 5B are diagrams showing a display example of postponement of recording start time and advancement of recording end time.

On the other hand, when the decision key 20e of the remote control 20 is pushed down in a state of positioning a cursor in a program frame (large frame constructed program) in which the partition line S is displayed (step S1 in FIG. 4), it is decided whether or not the directional key is pushed down within predetermined time (for example, five seconds) (step S2). When the directional key is pushed down herein, it is decided whether or not the right arrow key 20b is pushed down (step S3). When the right arrow key 20b is pushed down herein, one-stage postponement of recording start time is performed (step S4). That is, the display controller 15 positions and displays the cursor positioned in all of the program frame (large frame) of the program backward from the first partition line S as shown in FIG. 5A (shaded portions in FIG. 5A).

Figure 5B:
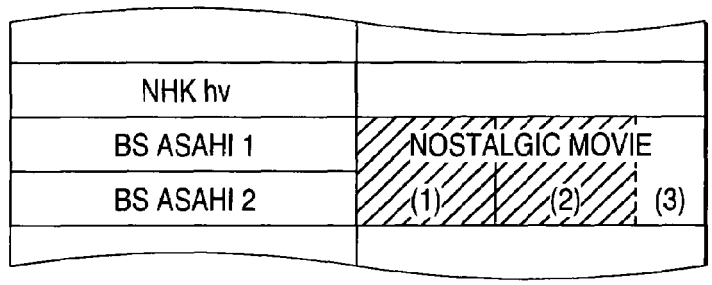
Figure 6:
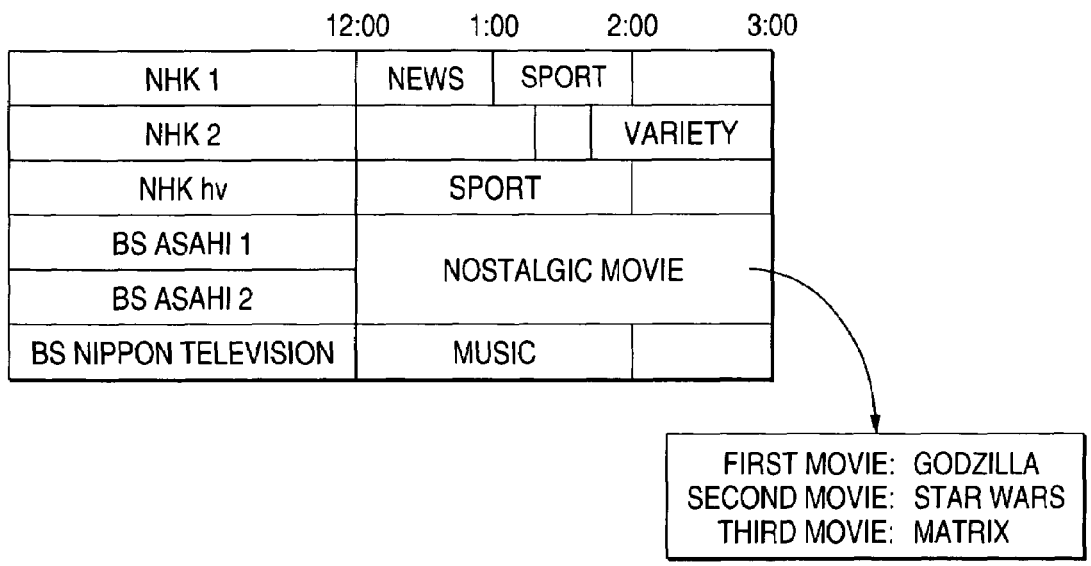
FIG. 6 is a diagram showing a display example of a conventional electronic program guide.

Next, it is decided whether or not the left arrow key 20d is pushed down (step S5). When the left arrow key 20d is pushed down herein, one-stage advancement of recording end time is performed (step S6). That is, the display controller 15 positions and displays the cursor positioned in all of the program frame (large frame) of the program forward from the last partition line S as shown in FIG. 5B (shaded portions in FIG. 5B). Then, it is decided whether or not the decision key 20e is pushed down (step S7).

When the decision key 20e is not pushed down herein, it is decided whether or not the up arrow key 20a or the down arrow key 20c is pushed down (step S8). When the up arrow key 20a or the down arrow key 20c is pushed down herein, processing of the postponement of recording start time or the advancement of recording end time performed by then is canceled (step S9) That is, the display controller 15 positions and displays the cursor in all of the program frame of the program, and returns to processing of a decision as to whether or not the right arrow key 20b is pushed down (step S3). On the other hand, when the up arrow key 20a or the down arrow key 20c is not pushed down, no processing is performed and it returns to processing of a decision as to whether or not the right arrow key 20b is pushed down (step S3).

Next, when the decision key 20e is pushed down in the decision (step S7), the recording controller 19 makes a recording reservation in a time zone of a cursor portion displayed by the display controller 15 (step S10). That is, large frame broadcast start time or time providing the partition line S in which postponement is performed (when the postponement is performed) is set as a channel of this program and recording start time, and large frame broadcast end time or time providing the partition line S in which advancement is performed (when the advancement is performed) is set as the channel and recording end time.

Then, in the case of becoming the set recording start time, the recording controller 19 outputs a recording signal from the light emitting part 22. By this recording signal, the VCR 4 makes recording of a video signal outputted from the NTSC encoder 18. Next, in the case of becoming the set recording end time, the recording controller 19 outputs a recording stop signal from the light emitting part 22. By this recording stop signal, the VCR 4 stops the recording of the video signal outputted from the NTSC encoder 18.

Further, when the directional key is not pushed down in processing of a decision as to whether or not the directional key is pushed down within the predetermined time (step S2), processing similar to that of a recording reservation in the normal program is performed (step S11).

For example, in the case of making a recording reservation for a program of "Star Wars" constructing "nostalgic movies" shown in FIG. 3, a cursor is first positioned in a large frame of "nostalgic movies" by operating the directional key of the remote control 20. Next, the right arrow key 20b is pushed down once to perform one-stage postponement of recording start time, and further the left arrow key 20d is pushed down once to perform one-stage advancement of recording end time, and the decision key 20e is pushed down. The recording reservation for the program of "Star Wars" is completed by the operations described above.

As described above, a recording reservation for a constructed program in the large frame constructed program can simply be made in an individual constructed program unit.

Next, another embodiment will be described, but description of a portion similar to that of the embodiment will be omitted and differences will be described.

In one-stage postponement processing of recording start time of the case that the right arrow key 20b is pushed down (step S4), the display controller 15 positions and displays a cursor positioned in a program frame of the program backward by the amount corresponding to predetermined time (for example, five minutes) from program start time. Further, in one-stage advancement processing of recording end time of the case that the left arrow key 20*d* is pushed down (step S6), the display controller 15 positions and displays a cursor positioned in a program frame of the program forward by the amount corresponding to predetermined time (for example, five minutes) from program end time.

Then, in the recording reservation processing (step S10), the recording controller 19 sets a time zone of a cursor portion displayed by the display controller 15, that is, broadcast start time of a program or time postponed in a predetermined time unit (when postponement is performed) as a channel of this program and recording start time, and broadcast end time of a program or time advanced in a predetermined time unit (when advancement is performed) as the channel and recording end time.

In this case, for example, when the right arrow key 20*b* is pushed down two times and the left arrow key 20*d* is pushed down three times, time postponed by ten minutes from broadcast start time of a program is set as recording start time and time advanced by fifteen minutes from broadcast end time of a program is set as recording end time. Incidentally, the predetermined time can also be constructed so as to be determined by initialization, or can also be constructed so as to be changed by operating a predetermined key.

By being constructed as described above, the recording start time and the recording end time can be set freely in a predetermined time unit to make a recording reservation without being obsessed with a program unit in the case of making a recording reservation using an electronic program guide.

Incidentally, in each the embodiment described above, the digital broadcast receiving apparatus 1 is constructed as an apparatus separated from the monitor 3 and the VCR 4, but it is not limited to this and, for example, it can also be built into the monitor 3 or the VCR 4.

Further, in each the embodiment described above, a program using two channels of a virtual channel as a program frame (large frame constructed program) in which the partition line S is displayed in FIG. 3 is taken as an example, and it is not limited to this and it may be used even for a program of one channel.

As described above, according to the invention, in a digital broadcast receiving apparatus for having a movable cursor in a program unit on an electronic program guide displayed on a monitor and making a recording reservation for a program in which the cursor is positioned in the program unit, the digital broadcast receiving apparatus comprises display controller for displaying a partition line in each the program unit constructed with respect to a program displayed by one program frame as one program even though being constructed of plural programs and also changing and displaying a cursor positioned in all of the program frame in a unit of the partition line, and recording controller for making a recording reservation for the constructed program in which the cursor changed and displayed in the unit of the partition line is positioned. As a result of this, a recording reservation for the constructed program in a large frame constructed program can simply be made in an individual constructed program unit.

Further, in a digital broadcast receiving apparatus for having a movable cursor in a program unit on an electronic program guide displayed on a monitor and making a recording reservation for a program in which the cursor is positioned in the program unit, the digital broadcast receiving apparatus comprises display controller for changing and displaying a cursor positioned in the program unit every predetermined time unit from program start time and/or program end time, and recording controller for making a recording reservation from start time to end time at which the cursor changed and displayed in the predetermined time unit is positioned. As a result of this, recording start time and recording end time can be set freely in the predetermined time unit to make a recording reservation without being obsessed with the program unit in the case of making a recording reservation using an electronic program guide.

What is claimed is:

1. A digital broadcast receiving apparatus comprising a movable cursor in a program unit on an electronic program guide displayed on a monitor and configured to make a recording reservation for a program on which the movable cursor is positioned in the program unit, comprising:

a display controller configured to:

display at least one partition line in a large frame constructed program, wherein the large frame constructed program is a single program comprising a plurality of successive programs displayed as a single program frame in the electronic program guide, and wherein the at least one partition line separates the plurality of successive programs in the large frame constructed program, and reposition the movable cursor between the plurality of successive programs separated by the partition line; and a recording controller configured to make a recording reservation for a portion of the large frame constructed program, wherein the portion of the large frame constructed program comprises at least one of the plurality of successive programs on which the movable cursor is positioned, wherein a remote control light receiving part is connected to the display controller, and a control signal from a second remote controller is inputted to the display controller through the remote control light receiving part to reposition the movable cursor between the plurality of successive programs separated by the partition line, a decision key, a right arrow key, and a left arrow key are mounted on the second remote controller, if the right arrow key is pushed down within a predetermined time after an action of making the recording reservation for the portion of the large frame constructed program, a control signal by the action is input to the display controller, and the movable cursor is repositioned between the plurality of successive programs separated by the partition line to correspond to postponement of the recording start time associated with the recording reservation by one stage, wherein the recording start time is postponed by one stage each time the right arrow key is pushed down within the predetermined time, and if the left arrow key is pushed down within a predetermined time after an action of making the recording reservation, a control signal by the action is input to the display controller, and the movable cursor is repositioned between the plurality of successive programs separated by the partition line to correspond to advancement of the recording end time associated with the recording reservation by one stage, wherein the recording end time is advanced by one stage each time the left arrow key is pushed down within the predetermined time.

2. A digital broadcast receiving apparatus comprising a movable cursor in a program unit on an electronic program guide displayed on a monitor and configured to make a recording reservation for a program on which the movable cursor is positioned in the program unit, comprising:

a display controller configured to change and display a width of the movable cursor positioned in the program unit to select a portion of a program displayed in the electronic program guide, wherein the width of the movable cursor is changed by a predetermined time unit from the program start time and the program end time; and a recording controller configured to make a recording reservation for a time corresponding to the changed width of the movable cursor, wherein a remote control light receiving part is connected to the display controller, and a control signal from a second remote controller is inputted to the display controller through the remote control light receiving part to change and display the width of the movable cursor by the predetermined time unit, and a decision key, a right arrow key and a left arrow key are mounted on the second remote controller, if the right arrow key is pushed down within a predetermined time after an action of making the recording reservation, a control signal by the action is input to the display controller, and the width of the movable cursor is changed and displayed to correspond to postponement of a recording start time associated with the recording reservation by one stage, wherein the recording start time is postponed by one stage each time the right arrow key is pushed down within the predetermined time, and if the left arrow key is pushed down within a predetermined time after an action of making the recording reservation, a control signal by the action is input to the display controller, and the width of the movable cursor is changed and displayed to correspond to advancement of a recording end time associated with the recording reservation by one stage, wherein the recording end time is advanced by one stage each time the left arrow key is pushed down within the predetermined time.

3. The digital broadcast receiving apparatus according to claim 2, wherein the predetermined time unit is set to be an arbitrary time by an operator at initialization.

\* \* \* \* \*